Figure 1:
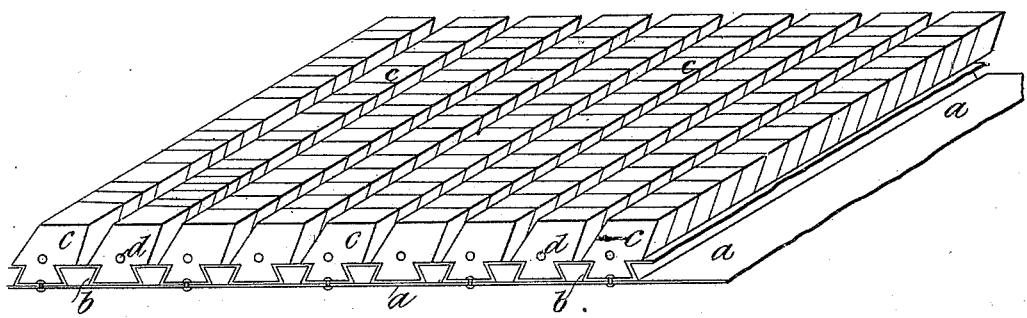

(No Model.) 2 Sheets—Sheet 1.

P. R. BEDLINGTON.
WEAR PLATE FOR BOOTS OR SHOES.

No. 464,845. Patented Dec. 8, 1891.

Witnesses
W. Cross
J. Bingham

Inventor
P. R. Bedlington
by A. E. Duffy
Atty.

(No Model.) 2 Sheets—Sheet 2.
P. R. BEDLINGTON.
WEAR PLATE FOR BOOTS OR SHOES.
No. 464,845. Patented Dec. 8, 1891.
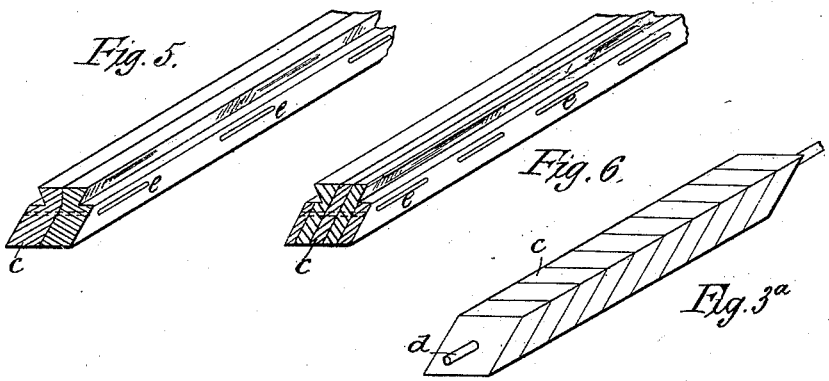
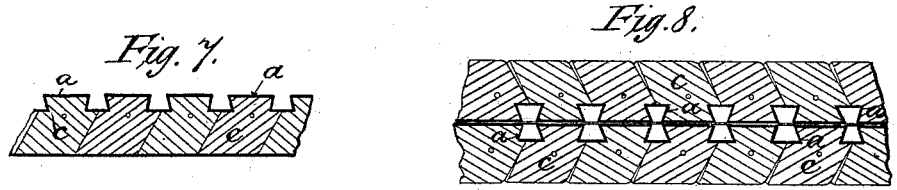
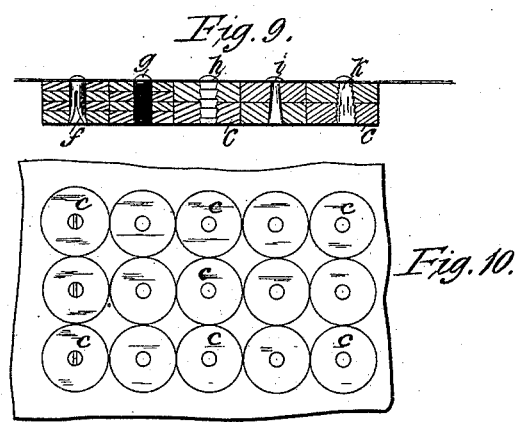
Witnesses
W. Cross
H. J. Bringham
Inventor
P. R. Bedlington
by A. E. Duffy atty.

UNITED STATES PATENT OFFICE.

PETER ROE BEDLINGTON, OF BILBAO, SPAIN, ASSIGNOR TO HIMSELF, AND ROBERT HAMMOND, OF LONDON, ENGLAND.

WEAR-PLATE FOR BOOTS OR SHOES.

SPECIFICATION forming part of Letters Patent No. 464,845, dated December 8, 1891.

Application filed January 2, 1889. Serial No. 295,227. (No model.) Patented in England October 13, 1888, No. 14,767.

*To all whom it may concern:*

Be it known that I, PETER ROE BEDLINGTON, engineer, a subject of the Queen of Great Britain and Ireland, residing at Bilbao, in the Kingdom of Spain, have invented Improvements in Wear-Plates for Boots, Shoes, and other Articles, (for which I have obtained British Letters Patent No. 14,767, dated October 13, 1888,) of which the following is a specification.

This invention has reference to the production of compound renewable wearing-surfaces in such a manner that in the production thereof scrap material can be advantageously utilized, thereby lessening the cost of production and renewal of the wearing parts, which consist of pieces of material of such shapes that the compound wearing-surface will be in sections and can be gradually restored, renewed, or built up by substituting new for worn parts without necessarily renewing the whole simultaneously. Such surfaces are suitable for various purposes, such as boot, shoe, slipper, and clog soles, driving-belts, bands for transporting loads, brake-straps, wheel-tires, horseshoes, mats, steps, stairs, flooring, &c.

A backing or core of suitable material, which may be inflexible or flexible, (such as thin sheet metal in the case of a backing,) according to the purpose to which the invention is to be applied, constitutes the base upon which the compound wearing-surface is built up of a number of scraps, bits, or strips, hereinafter called "wearing-pieces." These wearing-pieces may be of any suitable material—such as leather, gutta-percha, vulcanized india-rubber, vulcanite, woodite, cork, wood, (which may be of different kinds,) metal, such as soft iron, lead, (where weight is required, as for the boots of divers,) brass, copper, asbestus, (suitable for the soles of firemen's boots,) papier-maché, mill-board, carpet, linoleum, asphalt, terra-cotta, or other baked earths or combinations or compositions of such substances, the harder materials in this case being placed where there is likely to be the greater wear.

The backing or core and the wearing-pieces are respectively so formed or furnished with means of attachment as to admit of the securing of the wearing-pieces by or to the backing or core.

Backings with compound wearing-surfaces such as above described can be made so that they can be applied temporarily and removed when not required.

In articles having compound wearing-surfaces built up according to this invention the thickness of the wearing-surface may be varied without affecting the flexibility, which will be dependent upon the elasticity of the backing.

The edge or end principle may be applied in a variety of ways and the layer or layers of material constituting the wearing-pieces may be vertical, inclined, or parallel to the backing and be secured together by cementing, sewing, or otherwise, with or without pressure. For boots, shoes, &c., the wearing-pieces can be cut inclined, so as to overlap and prevent entry of dirt, &c., into the interstices.

The material of the wearing-pieces may be impregnated with liquid or molten gutta-percha, india-rubber, or other substances or chemicals to render the wearing-pieces impervious to moisture or otherwise tend to increase their durability; or the wearing-pieces may be of a compound or composition formed with molten gutta-percha, india-rubber, or the like, with the dust of leather or cork, sawdust, metal filings, brick-dust, or some of these or analogous substances, the whole being compressed.

If the backing be formed or furnished with suitable tapered recesses, such composition while soft can be compressed into the recesses.

Figure 2:
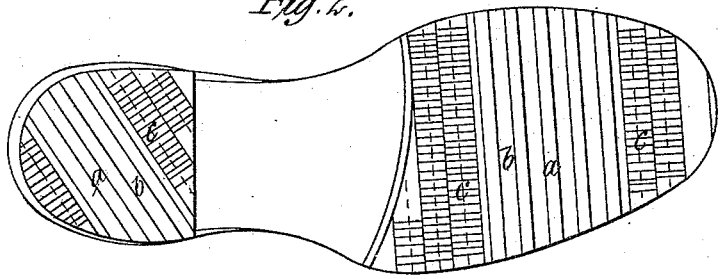
Figure 3:
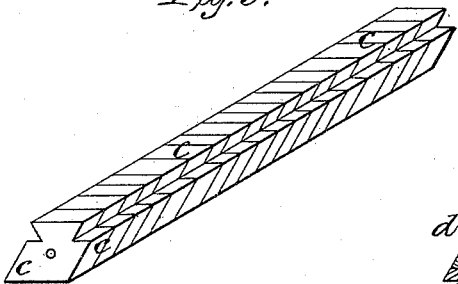
Figure 4:
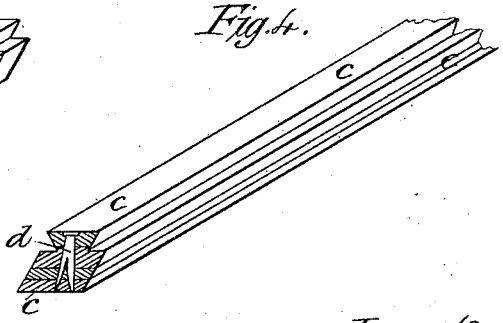

In the accompanying drawings, Figure 1 is a perspective view of a compound renewable wearing-surface, according to this invention. Fig. 2 shows such a wearing-surface applied to the sole and heel of a boot. Part of the surface is removed to show the backing. Figs. 3, 3ª, 4, 5, and 6 are perspective views of sections or groups of wearing-pieces variously arranged. In Fig. 3 the joints are at right angles to the axis of the section and also to the backing. In Fig. 4 the joints run parallel to the axis and to the backing. In Figs. 5 and C they are parallel to the axis and at oblique angles to the backing. Fig. 7 shows the wearing-pieces set to overlap. Fig. 8 shows the wearing-surfaces, arranged on both sides of a core or backing. Figs. 9 and 10 are two views of another arrangement of renewable wearing-surface.

In Fig. 1, $a$ is a flexible backing, which may be of metal, leather, or other suitable substance. To it there are attached the dovetails $b\ b$, which are by preference rolled or stamped out of sheet metal and riveted to the backing $a$. The wearing-pieces $c\ c$ are shaped to fit into the dovetails $b\ b$ and are held by them. They may be further supported by through pins or rivets $d\ d$, threaded through all the pieces in the same dovetail. The wearing-pieces shown in Fig. 1 are narrower at the end remote from the backing than at the end next the dovetails to allow of the flexible backing bending in both directions. Such a surface and backing as is shown in Fig. 1 is suitable for use as a driving-belt. When applied to the sole of a boot, as in Fig. 2, it is not necessary to provide for flexibility in both directions. It is also advantageous to make them overlap, as in Fig. 7, so as to prevent the entry of dirt between them as far as possible. For a belt that has to work on both sides the wearing-surfaces may be applied to both faces of the elastic backing, as in Fig. 8.

Fig. 3$^a$ shows the wearing-pieces threaded on a pin or rivet $d$, that may be rigid and be held to the object to be protected—such as the sole of a boot—by any convenient means.

When the wearing-pieces are subject to very heavy pressure, the forms shown in Figs. 1, 2, and 3 may be advantageously replaced by those in Figs. 4, 5, and 6. Here the pieces run lengthwise of the dovetails and are connected together by rivets or split pins $d$, Fig. 4, or by stitches $e\ e$, Figs. 5 and 6.

When the plane of the wearing-pieces is parallel to the elastic backing, they can be conveniently attached to it by pins, screws, rivets, or split pins, &c., as shown in Figs. 9 and 10.

$c\ c$ are the wearing-pieces. $f$ is a split pin; $g$, a screw; $h$, a serrated pin; $i$, a tapered pin, and $k$ a tapered serrated pin. Either of these forms of attachment or any other suitable means may be chosen, according to the purpose to which the renewable surface is to be applied. The wearing-pieces may be in one thickness or several thicknesses, and may be cylindrical, conical, pyramidal, hexagonal, square, or of other form, and their edges may be perpendicular to or inclined to the backing.

My invention has no relation to heavy marquetry flooring laid in cement or iron rails or composed of several layers of planks dovetailed together, and I make no claim to such constructions.

What I claim is—

1. A wear-plate for shoes and other purposes, having a flexible backing and the series of separate detachable closely-arranged groups of blocks secured thereto, each group being separate and separately secured and the blocks of each group being secured together, substantially as set forth.

2. A wear-plate for shoes and other articles, consisting of a flexible backing having a series of parallel dovetailed grooves formed thereon, and the series of separate groups of closely-arranged blocks in such grooves, the blocks in each group being secured together, as set forth.

3. A wear-plate for shoes and other purposes, consisting of the flexible backing and the closely-arranged separate series of detachable groups of blocks secured thereto, the blocks of each group being detachably secured together and formed and secured so that the tops of the blocks of one group overlap the bases of those of the next group, as set forth.

In testimony whereof I have signed my name to this specification in the presence of two subscribing witnesses.

PETER ROE BEDLINGTON.

Witnesses:
W. CROSS,
F. J. BROUGHAM,
*Both of 46 Lincoln's Inn Fields, London.*